3,459,558
COFFEE PELLET PROCESS

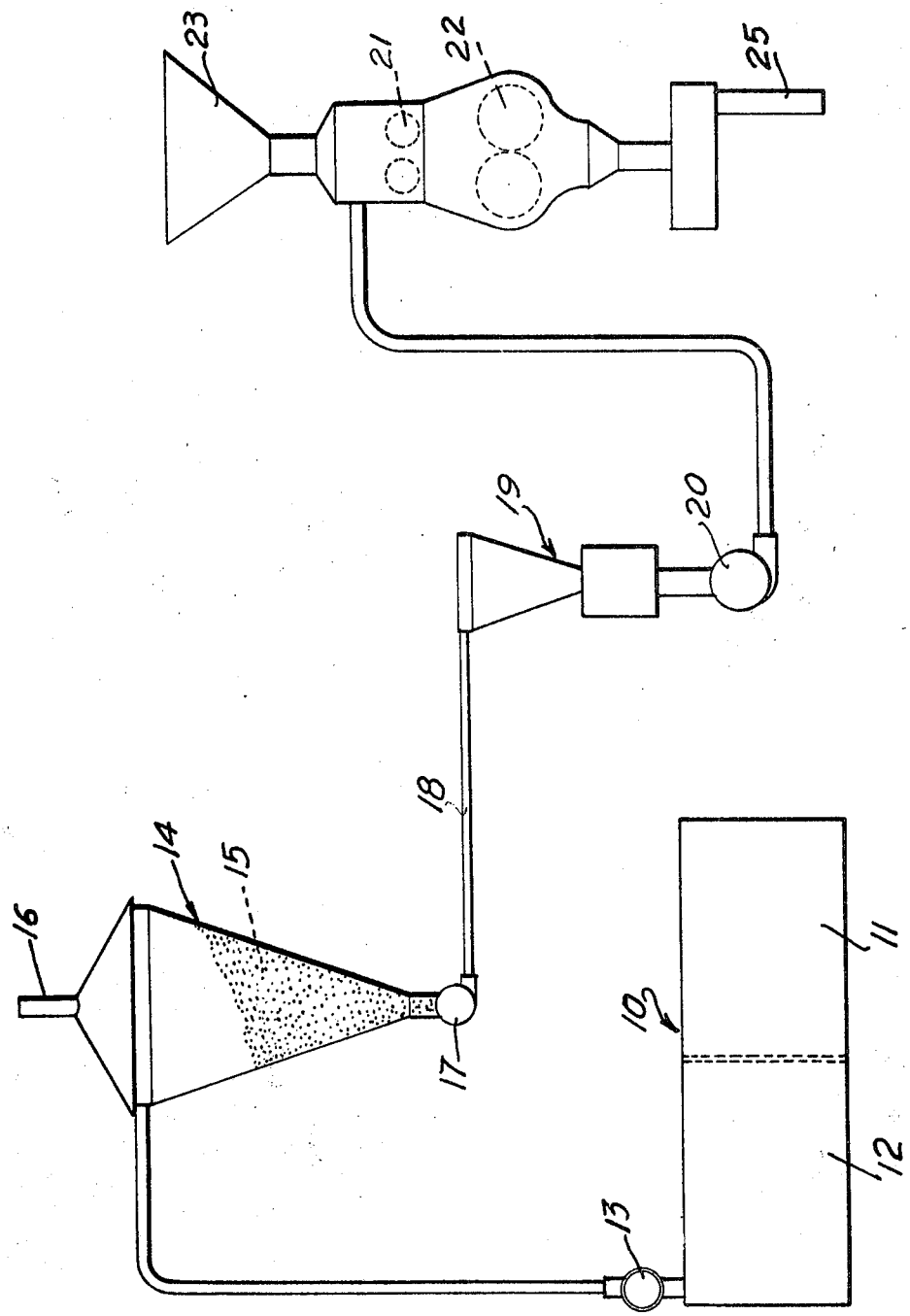

Roy F. Farmer, Los Angeles, and William Lloyd Chandler, Westminster Calif., assignors to Farmer Bros. Co., Torrance, Calif., a corporation of California
Filed Dec. 30, 1965, Ser. No. 517,731
Int. Cl. A23f 1/00, 1/02
U.S. Cl. 99—65                                    4 Claims

ABSTRACT OF THE DISCLOSURE

A process of preparing roasted coffee beans wherein the whole coffee beans are roasted, cooled and then cracked or ground to form the finished product including the steps of: removing the coffee chaff from the roasting operation, collecting said chaff, transferring said chaff to a pelletizer for forming into extruded pellets and adding the resulting pellets to the whole roasted coffee beans in the cracking or grinding step to form a finished product containing the treated chaff in a form substantially indistinguishable from the remaining coffee.

---

This invention relates to a coffee pellet process and more particularly to a system in which dry coffee chaff appearing in the roaster is taken, separated from the roasted beans, reconstituted in a pelletizing machine and mixed with the whole roasted coffee bean prior to the grinding, after which grinding it mixes with the coffee as an inseparable part thereof having the same color and flavor as the coffee with a resultant saving of the otherwise lost portion of the coffee bean which constitutes the chaff and with the production of a superior coffee possessing a flavor which is lost if the chaff is not thus utilized.

It is recognized in the art that coffee chaff contains a flavor ingredient which is desirable and it has therefore been previously suggested that such coffee chaff be utilized in the production of coffee extract in order to preserve this flavor element but it is the object of this invention to recover the otherwise lost coffee chaff and by pelletizing the same to place it in a form that it may be ground with the whole roasted coffee beans and added to the ground coffee in a form indistinguishable from the ground coffee bean itself.

In the absence of the process of this invention, coffee chaff is lost which constitutes about one percent (1%) by weight of the entire coffee bean. In the conventional production of coffee the whole coffee beans are roasted in a continuous roaster. In this roasting step the coffee bean swells and loses weight and a thin silver-like shell is produced which covers the green coffee bean which pulls off in a form of a light fluffy chaff in the cooling portion of the coffee roaster. The chaff, as it is produced in the roaster, is too light to be effectively conveyed and the structure and area is such that it cannot be effectively ground in the coffee mills but would remain and appear as chaff in the finished coffee.

It is a feature of the present invention that the chaff resulting from the roasting operation is separated along with the hot air from the coffee roaster and collected in a collector from which the hot air is expelled and in which the chaff is collected and thereafter the chaff is transferred to a pelletizer of conventional construction such as the type used for pelletizing feed in dairies for feed lot operators and in pelletizing feed for hogs and poultry production. This pelletizing results in a form of hard dry pellets which can be conveyed to the roasted coffee and mixed and ground therewith.

These and other objects, features and advantages will be apparent from the annexed specification in which the drawing is a schematic representation of the process and apparatus of the present invention.

Referring now more particularly to the drawings, the numeral 10 indicates a conventional coffee roaster which is continuous and has a section 11 in which the whole coffee bean is roasted and a section 12 in which the roasted coffee is cooled and in which the outer shell of the roasted coffee bean pulls off in the form of a light fluffy chaff. This chaff is picked up and carried, entrained in the hot air discharged from the cooling end 12 of the coffee roaster by means of a pneumatic blower 13 which passes the hot air and the co-mingled chaff to a collector 14. The chaff 15 collects in the collector while the hot air is discharged to the atmosphere through the vent 16.

In the conventional coffee roaster there is a large amount of hot air available to constitute the conveying means in conveying the chaff to the collector 14. From the collector 14 the chaff is conveyed as by a chaff blower 17 through a conduit 18 to a chaff pelletizer 19. In practice, a conventional portable feed pelletizer manufactured by the Superior Division of Daffin Corporation, Hopkins, Minn. is used though any of the well-known feed pelletizers are equally available. In this pelletizer the chaff is cooled, moisturized, extruded through pressure dies in the form of tubular pieces of approximately one-fourth inch (¼") in length which are hard and dry and have the same color and flavor as the coffee bean but possess a quality of being capable of being ground with the whole roasted coffee bean without resuming the appearance or consistency of chaff. The pellets thus resulting from the peletizer 19 are transferred by a blower 20 to the coffee grinders illustrated schematically by the cracker rolls 21 and finishing rolls 22 and in the process are joined by being mixed with the whole coffee beans transferred at 23 to be ground with the pellets for discharge from the discharge opening 25 as finished ground coffee ready for packing.

In the foregoing description the details of the pelletizing process taking place in the pelletizer 19 are not particularized to any extent because of the fact any conventional pelletizing device capable of pelletizing grain or feed or the like may be used and the pressures and humidities involved are those inherent in the pelletizing device as purchased on the open market and form no part of the present invention except for the fact that the present invention contemplates the use of such conventional apparatus.

As stated above the pellets formed of the chaff are ground together with the whole roasted coffee bean and appear in the finished product as indistinguishable from the ground whole coffee bean coffee yet the overall result is not only an increase in volume but an improvement in flavor of the finished coffee.

While there has been described what is at present considered the preferred method of carrying out the process of this invention it will be apparent from those skilled in the art that various changes and modifications can be made thereof without departing from the essence of the invention and it is intended to cover herein all such changes or modifications which comes within the true spirit and scope of the appended claims.

We claim:
1. A process of preparing roasted coffee beans wherein the whole coffee beans are roasted, cooled and then cracked or ground to form the finished product including the steps of: removing the coffee chaff from the roasting operation, collecting said chaff, pelletizing said chaff and adding the resulting pellets to the whole roasted coffee beans in the cracking or grinding step to form a finished product containing the treated chaff in a form substantially indistinguishable from the remaining coffee.

2. A process as set forth in claim 1 in which the coffee chaff is removed from said roasting operation entrained with the hot air discharged from said roasting operation.

3. A process as set forth in claim 1 in which the coffee chaff is removed from said roasting operation entrained with the hot air discharged from said roasting operation, said hot air and entrained chaff are separated, and the chaff collected and the hot air discharged.

4. A process as set forth in claim 1 in which the coffee chaff is removed from said roasting operation entrained with hot air discharged from said roasting operation, said hot air and entrained chaff are separated, the chaff collected and the hot air discharged, and the collected chaff pelletized.

References Cited

Sivetz, M. et al.: "Coffee Processing Technology," Avi Pub. Co., Westport, Conn., vol. I, 1963, pp. 242, 244, 245.

MAURICE W. GREENSTEIN, Primary Examiner

U.S. Cl. X.R.

99—68